Nov. 24, 1931.  C. F. WRAY  1,833,193
VALVE STRUCTURE
Filed May 21, 1927  2 Sheets-Sheet 1

INVENTOR
Charles F. Wray
By Harold E. Stonebraker
his ATTORNEY

Nov. 24, 1931.     C. F. WRAY     1,833,193
VALVE STRUCTURE
Filed May 21, 1927     2 Sheets-Sheet 2
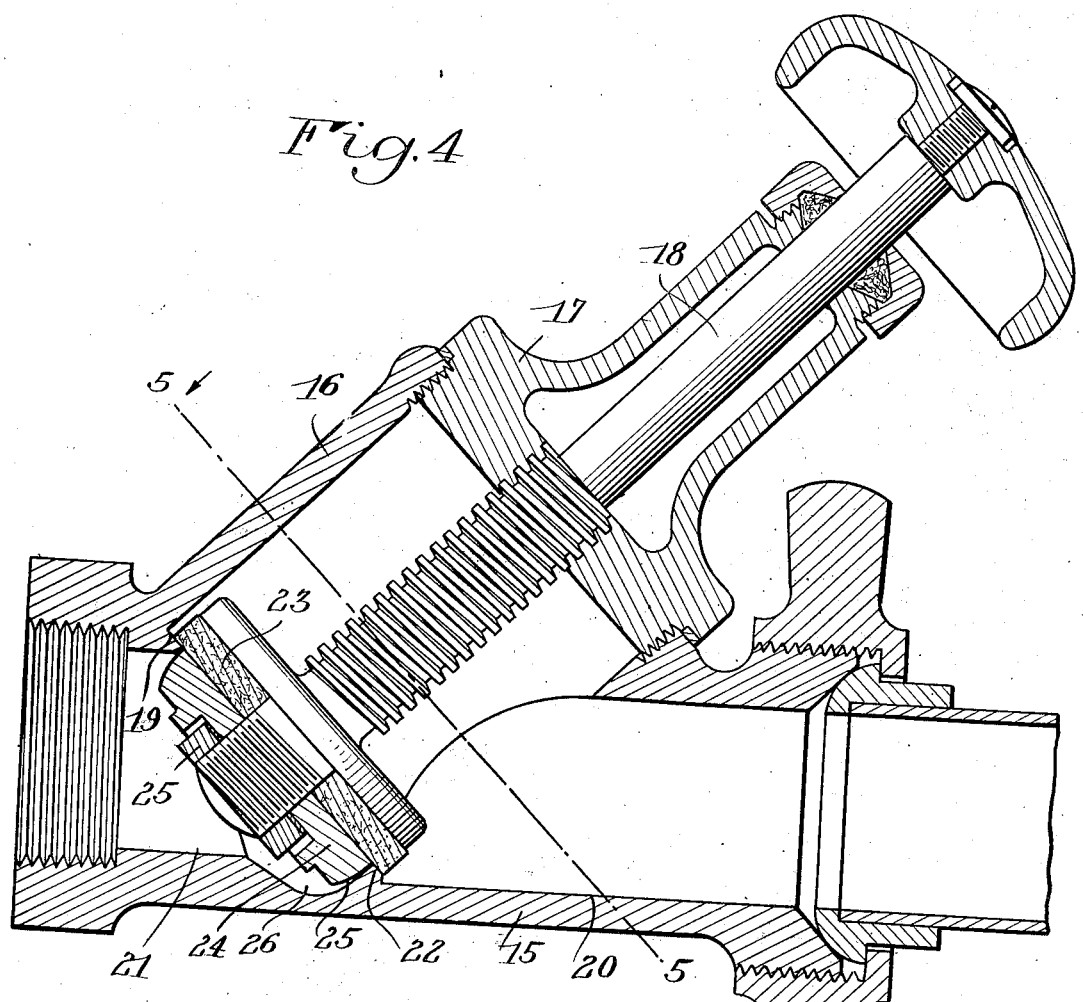
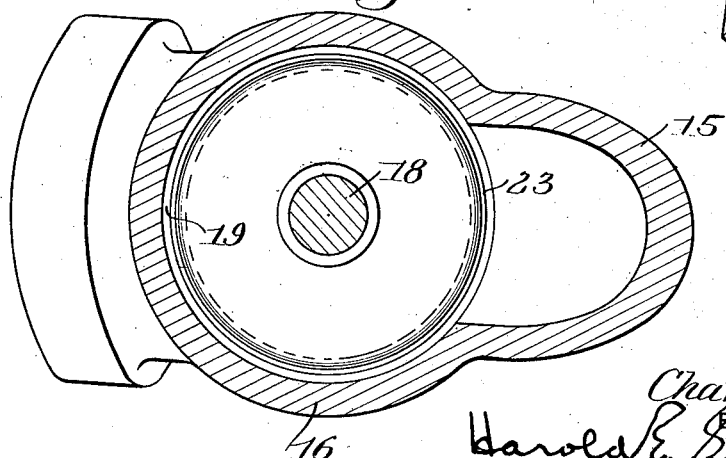

Patented Nov. 24, 1931

1,833,193

UNITED STATES PATENT OFFICE

CHARLES F. WRAY, OF ROCHESTER, NEW YORK, ASSIGNOR TO NATIONAL BRASS MANUFACTURING COMPANY, OF ROCHESTER, NEW YORK, A CORPORATION OF NEW YORK

VALVE STRUCTURE

Application filed May 21, 1927. Serial No. 193,291.

This invention relates to a valve structure, and more particularly to such valves as are used for controlling the flow of beverages, and must be kept sterile, although applicable to other uses.

More particularly, the invention comprises a valve and valve housing disposed at an acute angle to the longitudinal axis of a pipe section, and constructed so that the valve parts can be readily removed and the entire unit thoroughly cleaned, thus affording a sanitary construction.

Another object of the invention is to provide a pipe section with an integral angularly disposed valve seat so formed in the pipe as to afford a substantially uninterrupted bottom, so that the pipe will drain readily and can be easily cleaned by passing a swab therethrough.

To these ends, the invention consists in the construction and arrangements of parts that will appear from the following description when read in conjunction with the accompanying drawings, the novel features being pointed out in the claims following the description.

In the drawings:

Figure 4 is a sectional view of a modified adaptation of the invention showing its application to controlling a flow where the rate of flow upon opening or closing is important, and Figure 5 is a sectional view on line 5—5 of Figure 4.

Figure 1:
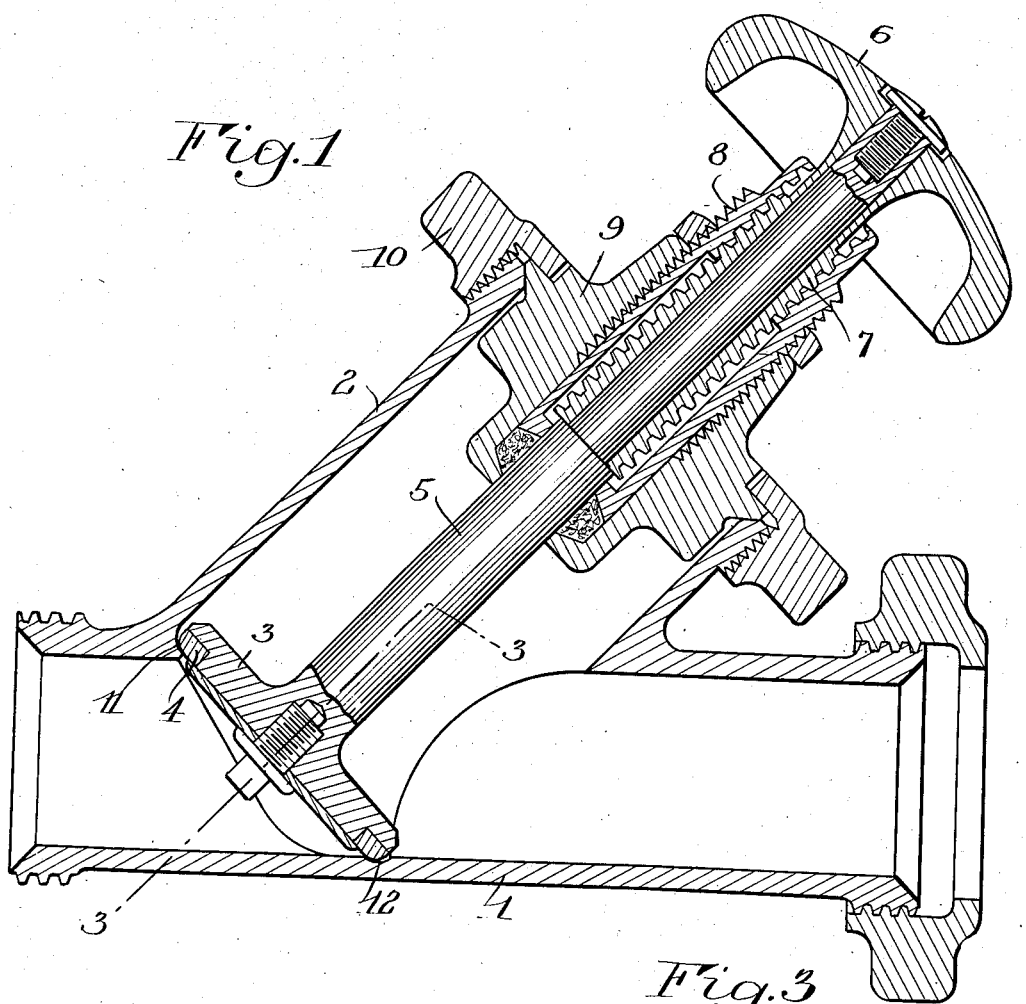
Figure 1 is a sectional view of a pipe section with a preferred embodiment of the invention applied thereto, as adapted for controlling flow of beverages.
Figure 2:
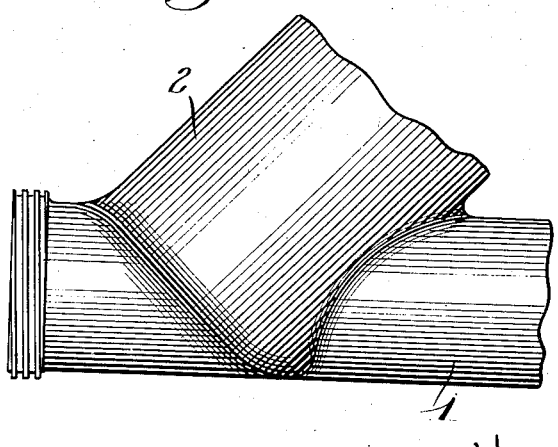
Figure 2 is a side elevation of the pipe section, with parts broken away.
Figure 3:
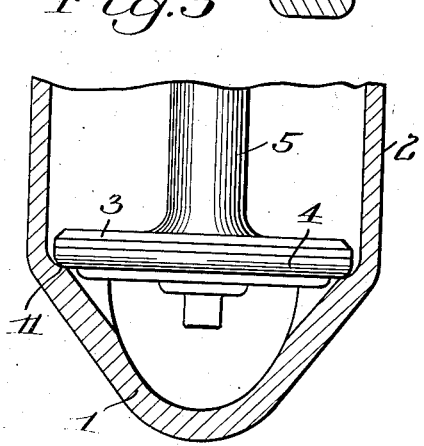
Figure 3 is a sectional view on the line 3—3 of Figure 1, partially broken away.

Referring more particularly to the drawings in which like reference numerals refer to similar parts throughout the several views. 1 designates a pipe section adapted to form part of a pipe line, and 2 is a valve housing formed integrally with and of greater diameter than the pipe section and arranged at an acute angle to the longitudinal axis of the pipe section 1. 3 designates a valve having a seat portion 4 of block tin or other suitable material and including a stem 5 and handle 6. The stem 5 is provided with a threaded sleeve 7 which is rotatable in a threaded portion 8 of a support 9, the latter being held in place in the housing by the threaded collar 10.

By turning handle 6, the valve is moved toward or away from its seat, which is formed integrally with the pipe section as shown in Figure 1. The upper and side portions of the seat are formed by a shoulder 11 at the bottom of the enlarged valve housing 2 and at the intersection between said valve housing and the pipe section 1, while the lowermost portion of the valve seat is afforded by a depression 12 formed in the bottom surface of the opening in the pipe section, such depression affording a contacting surface against which the bottom part of the seating portion 4 engages.

With this arrangement, a tight closure is possible while at the same time thorough cleansing is permitted. The valve can be quickly removed by taking off the nut 10, after which a swab can be passed through the pipe section and through the valve housing, the parts being easily and thoroughly cleansed. There are no projecting parts or obstructions to prevent intimate cleansing contact, and the pocket afforded by recess 12 is not of sufficient size to prevent proper cleaning since by passing a cloth along the bottom of the opening in the pipe section any fluid remaining in the recess 12 is removed.

Figures 4 and 5 illustrate a modified arrangement of the invention as adapted to a line where controlling the rate of the time of opening and closing is important. 15 designates the pipe section, 16 the valve housing, 17 the valve support threaded into the housing 16, and 18 the valve stem having threaded engagement with the support 17. The valve seat is designated at 19, being formed integrally with the pipe section, as is also the housing 16. The lower part of the valve seat is formed in the bottom surface of the pipe opening, such bottom surface having a lower level beyond the valve, at 20, than on the inlet side of the valve, at 21. The latter level 21 is in the same horizontal plane with the top of the lower part of the seat, indicated at 22.

The valve includes a disk 23 surmounted by a head 24 having a spherical-like side wall 25 which serves to guide and center the valve as it seats, and also by reason of the curvature of its side wall, acts to permit a gradual enlargement of the opening as the valve is opened, thus preventing a sudden rush of liquid past the valve, that would be detrimental to a clarifying machine. The head 24 is retained by nut 25ª threaded on to the stem, and 26 is a recess or pocket formed in the bottom of the pipe opening to receive the adjacent part of the head 24 when the valve is closed, as shown in Figure 4.

It will be seen that the valve seat does not obstruct movement of liquid through the pipe or prevent proper draining, because the fluid travels from the higher level 21 to the lower level 20, and only a negligible amount of liquid would be pocketed in the recess 26. When the parts are to be cleaned, by removing support 17 and the valve, the entire interior of the valve housing and pipe section can be easily cleansed by inserting a swab through the respective openings.

While the invention has been described with reference to certain forms of construction, it is not confined to the embodiments herein illustrated, and this application is intended to cover any changes or departures coming within the intent of the improvement or the scope of the following claims.

I claim:

1. In a valve structure, the combination with a pipe, of a valve housing integral with the pipe and arranged at an acute angle to the longitudinal axis of the pipe, a valve stem movable endwise of said housing, a valve seat arranged at right angles to the longitudinal axis of said valve stem, a disk having a seat engaging portion also arranged in a plane at right angles to the valve stem carried by the valve stem and movable axially with the valve stem into engagement with said valve seat, and a head on the valve stem having a spherical-like outer surface that is of smaller diameter than the valve seat so as to pass freely therethrough but lie closely adjacent thereto when the valve is closed so as to afford a gradual opening and closing of the passage.

2. In a valve structure, the combination with a pipe, of a valve housing integral with the pipe and arranged at an acute angle to the longitudinal axis of the pipe, a valve stem movable endwise of said housing, a valve seat arranged at right angles to the longitudinal axis of said valve stem, a disk having a seat engaging portion arranged in a plane substantially parallel to the seat and movable freely to and from engagement therewith, and a head on the valve stem movable freely through the valve seat but closely adjacent thereto so as to afford a gradual opening and closing of the passage.

In witness whereof, I have hereunto signed my name.

CHARLES F. WRAY.